(12) United States Patent
Duffy

(10) Patent No.: US 7,494,176 B1
(45) Date of Patent: Feb. 24, 2009

(54) PLUG TYPE PET WINDOW FOR VEHICLE AND VEHICLE ACCESSORIES

(76) Inventor: Kyle William Duffy, 20 Fenderson Rd., Saco, ME (US) 04072

( * ) Notice: Subject to any disclaimer, the term of this patent is extended or adjusted under 35 U.S.C. 154(b) by 0 days.

(21) Appl. No.: 11/978,042

(22) Filed: Oct. 29, 2007

(51) Int. Cl.
*B60J 1/20* (2006.01)

(52) U.S. Cl. .......................... 296/152; 49/48

(58) Field of Classification Search ............... 296/152, 296/146.15, 146.1, 97.9, 201; 49/502, 165, 49/48
See application file for complete search history.

(56) References Cited

U.S. PATENT DOCUMENTS

| | | | | |
|---|---|---|---|---|
| 1,294,879 A | * | 2/1919 | Davis | 49/48 |
| 1,535,045 A | * | 4/1925 | Scheidecker | 49/48 |
| 1,584,910 A | * | 5/1926 | Volker | 296/152 |
| 1,721,223 A | * | 7/1929 | Kern | 49/48 |
| 1,909,639 A | * | 5/1933 | Smith et al. | 49/48 |
| 2,061,689 A | * | 11/1936 | Wilson | 49/48 |
| 2,715,866 A | * | 8/1955 | Mousel | 266/152 |
| 2,913,780 A | * | 11/1959 | Weisselberg | 49/171 |
| 3,605,341 A | * | 9/1971 | Puckett | 49/48 |
| 4,730,413 A | * | 3/1988 | Henry | 49/48 |
| 4,840,217 A | * | 6/1989 | Evans, III | 49/67 |
| 5,117,890 A | * | 6/1992 | Taylor et al. | 160/180 |
| D349,676 S | * | 8/1994 | Peterson et al. | D12/183 |
| 5,467,557 A | * | 11/1995 | Jones | 49/48 |
| 6,385,909 B1 | * | 5/2002 | Marsh et al. | 49/169 |
| 6,634,407 B1 | * | 10/2003 | Strohmeyer | 160/180 |
| 6,968,648 B2 | * | 11/2005 | Bourque et al. | 296/153 |
| 7,159,360 B2 | * | 1/2007 | Platts | 49/57 |

* cited by examiner

*Primary Examiner*—Kiran B. Patel

(57) ABSTRACT

A pet window that is both removable and lockable and of appropriate size to facilitate the penetration of a pets head and which is incorporated into the original manufacture of window sections or the manufacture of said window sections replacement for vehicles and vehicle accessories. The purpose of the pet window is to facilitate access to the exterior environment by a pet from a location inside a vehicle or within the confines of a truck bed when access by the pet would otherwise be denied by said window section.

3 Claims, 4 Drawing Sheets

US 7,494,176 B1

PLUG TYPE PET WINDOW FOR VEHICLE AND VEHICLE ACCESSORIES

CROSS-REFERENCE TO RELATED APPLICATIONS

Not Applicable

FEDERALLY SPONSORED RESEARCH OR DEVELOPMENT

Not Applicable

PARTIES TO A JOINT RESEARCH AGREEMENT

Not Applicable

SEQUENCE LISTING

Not Applicable

BACKGROUND OF THE INVENTION

The field of this described invention is related to vehicle body structure or accessory to said structure and more particularly where an enclosed compartment is adapted to better accommodate a pet animal located therein. The field of this invention is also related to ventilation, particularly for vehicle and vehicle accessory window sections where said window section is adapted in order to accommodate a pet animal's ability to access the ambient environment exterior to the vehicle.

Many vehicles and vehicle accessories incorporate window sections that do not open sufficiently to allow a pet access to the exterior environment from the pet's location inside the vehicle. I am not aware of any prior art that would allow a pet animal access to the air exterior to a vehicle where said window section creates a barrier. The below described invention solves this problem.

BRIEF SUMMARY OF THE INVENTION

A pet window that is both removable, lockable and able to facilitate the penetration of a pets head for the purpose of accessing the exterior environment from the pets location inside a vehicle and which is incorporated into the original manufacture of a window section or the manufacture of said window sections replacement for vehicles and vehicle accessories where access by the pet would otherwise be defined by said window section. The advantages of the described invention are simplicity as it applies to manufacture, installation and use. The object of the described invention is to provide a pet animal access to the environment exterior to a vehicle or truck bed from the pet's interior location where access would otherwise be denied. A pet window for this application is described.

BRIEF DESCRIPTION OF THE SEVERAL VIEWS OF THE DRAWING

The drawings contained herein form a part of the specification and represent a preferred embodiment for the purpose of making the pet window functional.

DETAILED DESCRIPTION OF THE INVENTION

Figure 1:
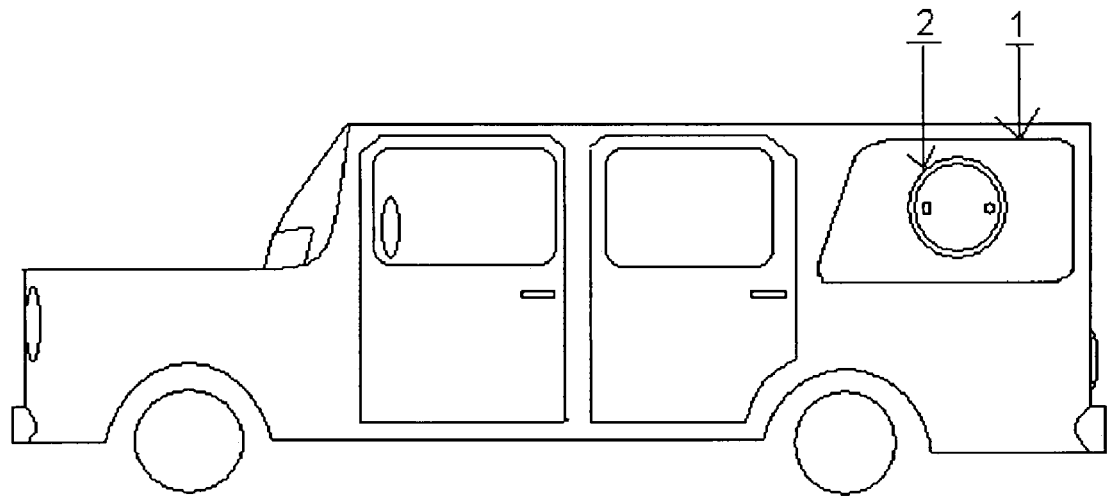
FIG. 1. represents passenger vehicles of all types that have as a part of them window sections that do not open sufficiently to allow a pet access to the exterior environment and illustrates a typical location of a pet window in said window section.
Figure 2:
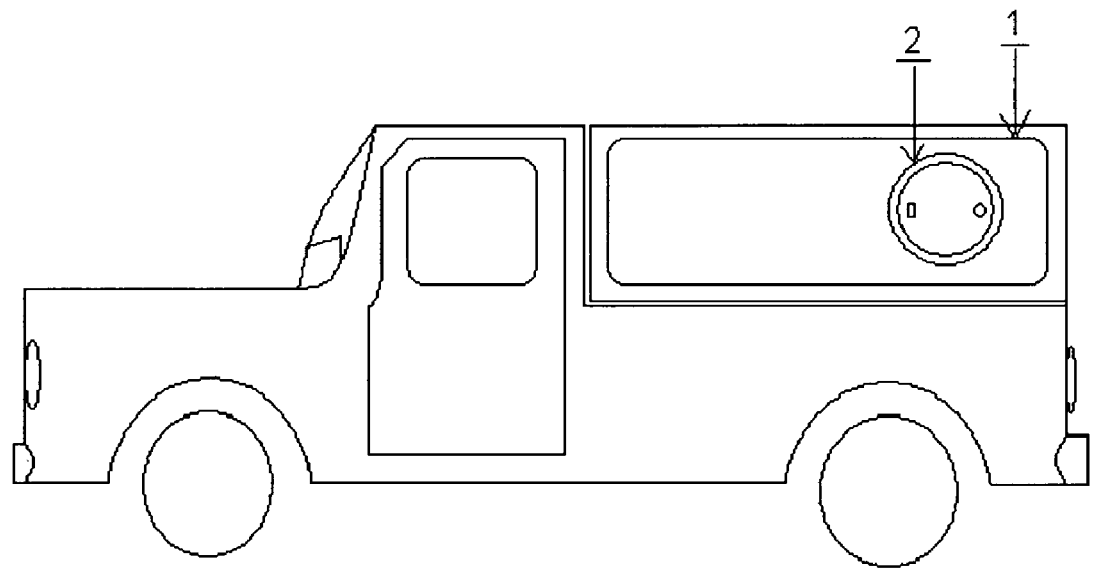
FIG. 2. represents a pickup truck with vehicle accessory truck cap that has as a part of it window sections that do not open sufficiently and illustrates a typical location of a pet window in said window section.
Figure 3:
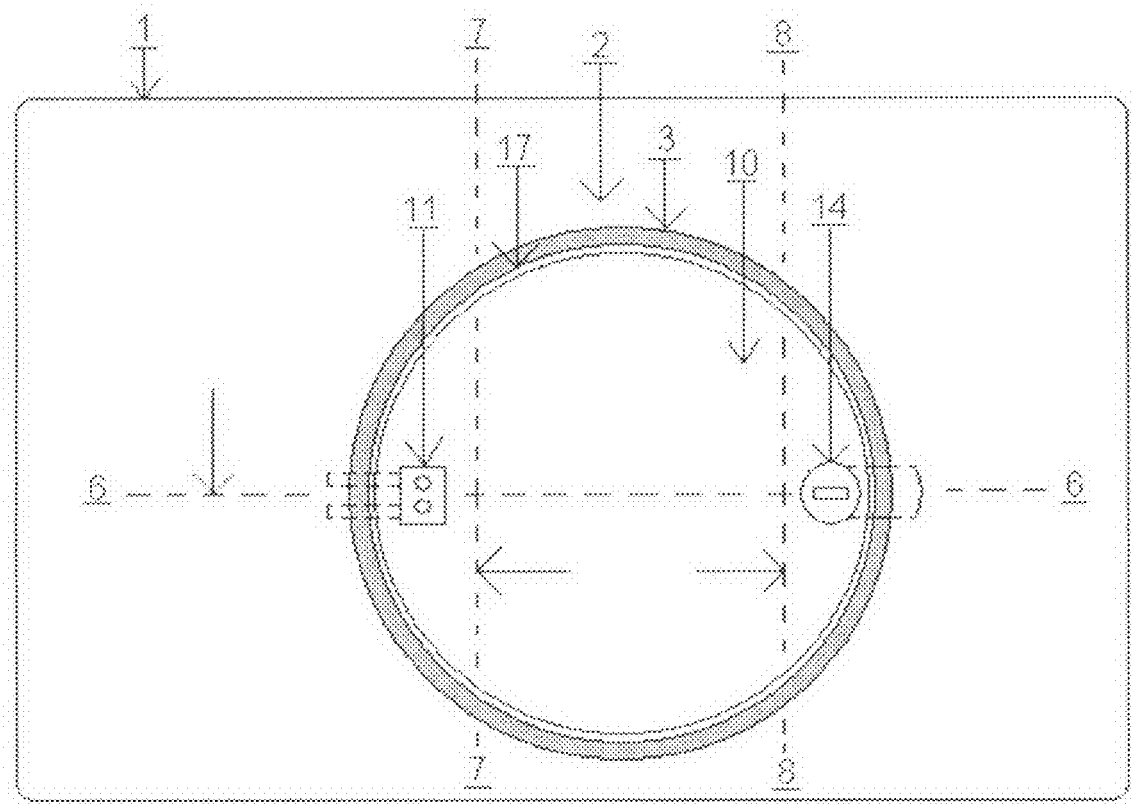
FIG. 3. is a plan view of a pet window as a part of a window section.
Figure 4:
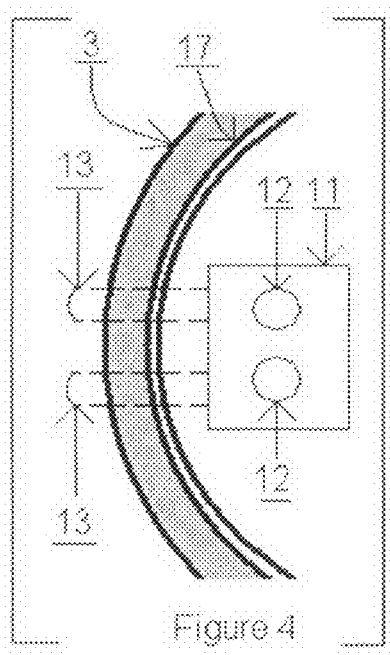
FIG. 4. is an expanded view of the anchor pin assembly with the plug in the closed position.
Figure 5:
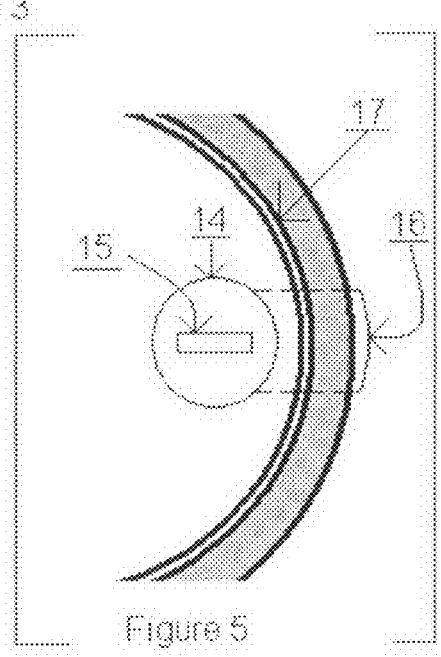
FIG. 5. is an expanded view of the cam lock and locking arm with the plug in the closed position.

All views described below refer to the drivers (left) side of a vehicle as viewed from outside and from an abeam position relative to said vehicle. The terms forward and aft are relative to the vehicle and would remain accurate for a pet window installed on the passenger (right) side of a vehicle. FIG. 1 depicts a typical passenger vehicle and window section (1) and typical location of a pet window (2). FIG. 2 depicts a typical pickup truck and associated truck cap with a window section (1) and typical location of a pet window (2). FIG. 3 depicts a round piece of glass which functions as a plug (10) insert herein referred to as the plug (10) sized to fit into a round opening (17) manufactured into the window section (1). The plug (10) will consist of the same characteristics in thickness, contour and tint as the window section (1) to which it will be placed. The plug (10) viewed from the outside of the window section (1) having an anchor pin assembly located at the 9 O'clock (forward) position and a cam lock located at the 3 O'clock (rearward) position. The anchor pin assembly (11) is mounted on the interior side of the plug so as to enable the anchor pins insertion into the anchor points of the interior flange located at the 9 o'clock (forward) position of the opening (17). In this embodiment the anchor pin assembly (11) is mounted using bolts through pre-drilled holes in the plug (10). An alternative method is to glue the anchor pin assembly (11) to the plug (10). The cam lock (14) shall be located to enable its locking arm to engage the slot of the interior flange at the 3 o'clock position of the opening (17). The cam lock (14) is mounted to the plug (10) in accordance with the instructions given by the lock manufacturer.

Figure 6:
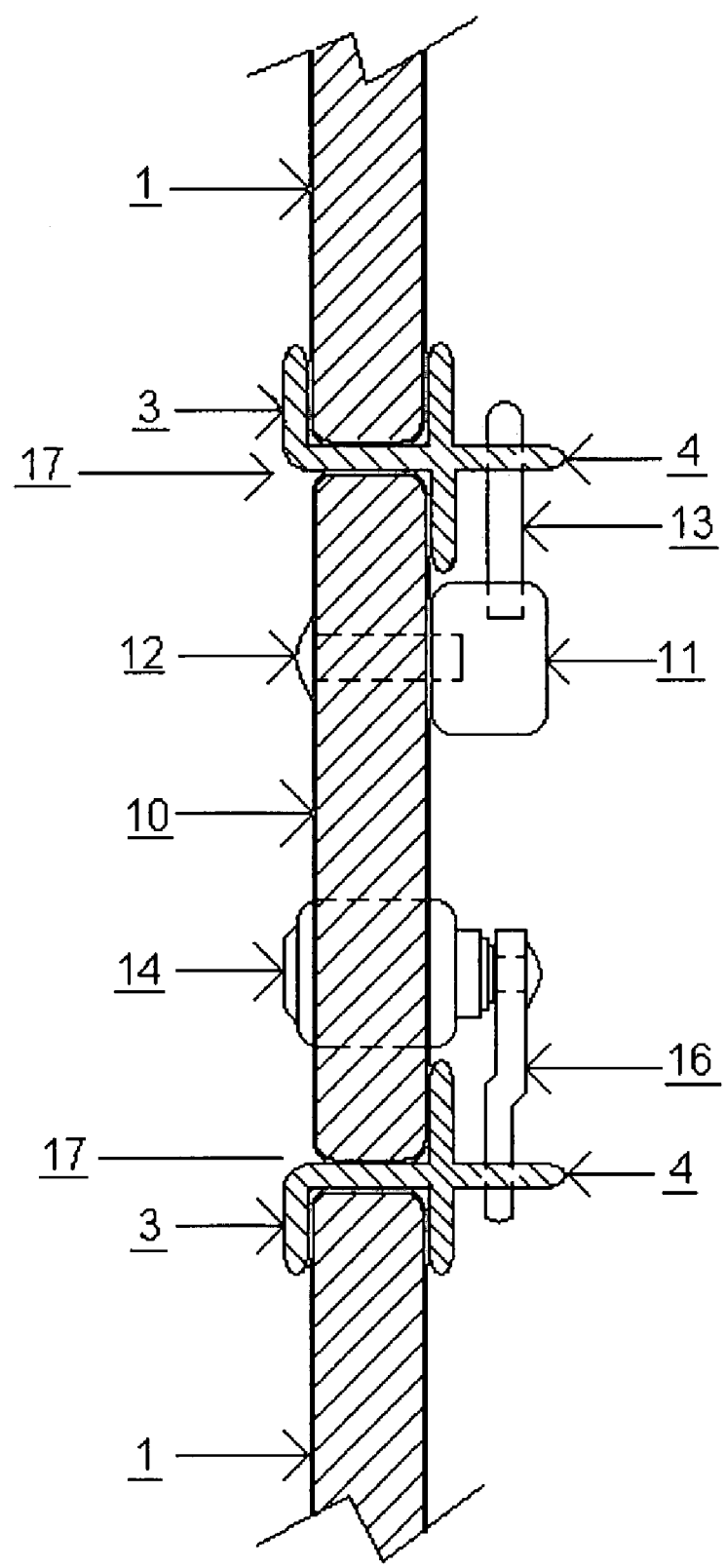
FIG. 6. is a cross-sectional view taken substantially along line 6-6 of FIG. 3 illustrating the plug seated within the opening and the anchor pins and cam lock arm engaged with the interior flange of the molding.
Figure 7:
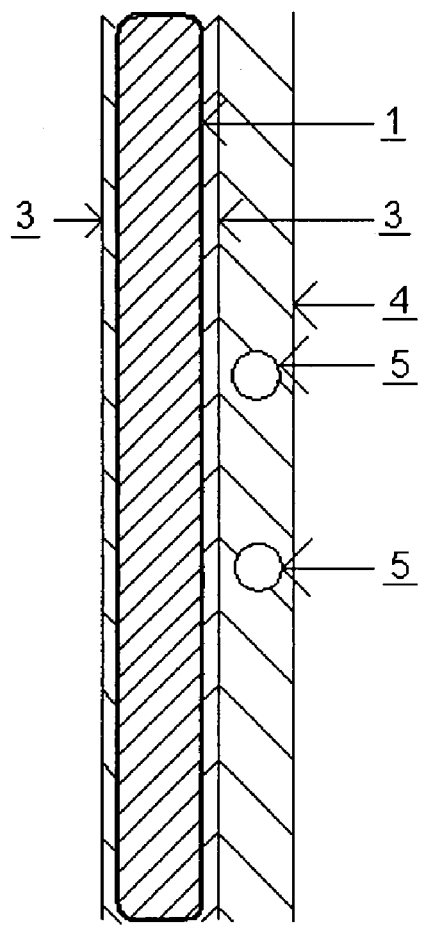
FIG. 7. is a cross-sectional view taken substantially along line 7-7 of FIG. 3 illustrating the interior flange of the molding with the plug removed to expose the anchor point holes in said interior flange.
Figure 8:
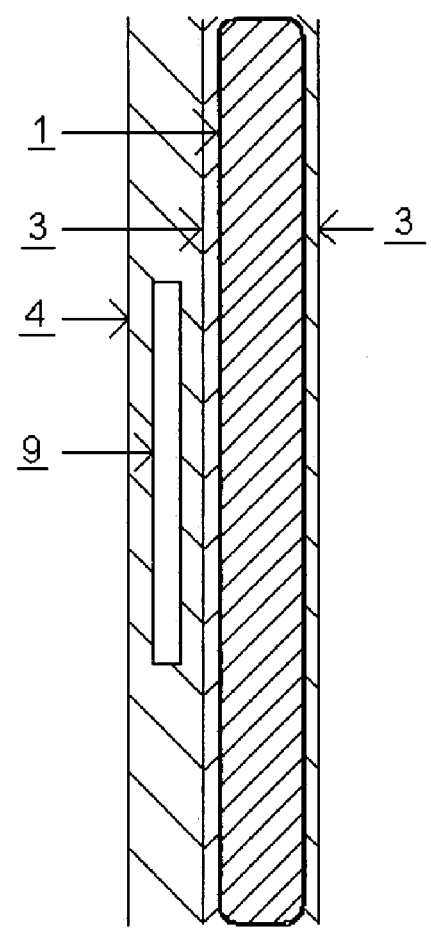
FIG. 8. is a cross-sectional view taken substantially along line 8-8 of FIG. 3 illustrating the interior flange of the molding with the plug removed to expose the slot in said interior flange for receiving the cam lock arm.

The opening shall be fitted with molding around its circumference. FIG. 6. (3) and (4) represent a design for a molding (3) that satisfies the requirements set forth in this paragraph. The molding (3) is attached to the circumference of the opening (17) using appropriate glue. The molding (3) will be designed such that when the plug (10) is in the closed and seated position within the opening (17) the plugs (10) elevation is the same as the elevation of the window section (1) to which it is being inserted and thereby flush. The molding (3) will permit the plug (10) to fit in a secure and sealed manner so as to prevent moisture and exterior elements from entering the vehicle when the plug (10) is in the closed position. The molding (3) will incorporate the appropriate materials and be of such design to facilitate closing and locking the plug (10) in place within the opening (17). The molding (3) being designed with an interior flange (4) which when viewed from the outside of window section (1) will have at its 9 O'clock (forward) position two holes serving as anchor points (5) to receive the anchor pins (13). The interior flange (4) will have at its 3 O'clock (rearward) position a slot (9) to accept the locking arm (16) thereby locking the plug (10) in place within opening (17).

The above description as it relates specifically to attachment points and locking mechanism at the forward and rearward position of the plug (10) and opening (17) is but one embodiment for the purpose of making said pet window functional and is meant to describe a good and practical way of opening and closing the same.

The above described pet window is easily opened and closed. To open simply insert a key into the key slot and rotate key to the unlocked position. This action will disengage the locking arm (16) from the slot (9) of the interior flange (4) and allow for the removal of the plug (10) from its opening (17). The plug (10) may then be placed into a pouch and stored inside the vehicle at a convenient location. To close simply remove the plug (10) from its holding pouch and replace into the opening (17) by first inserting the anchor pins (13) into the anchor points (5) of the interior flange (4) and then positioning the plug (10) into the closed and seated position. Insert key into the key slot (15) and rotate key to the locked position.

The best mode of carrying out this invention is during the original manufacturer of the window section (1) or its replacement. The opening (17) diameter will be appropriate to the size of the pet. The opening (17) shall be placed in the appropriate location of the window section (1) considering structural integrity and height requirements to enable its use by the pet. The window section (1) having been designed to fit a particular make and model of vehicle or vehicle accessory both in shape and contour needs only to have the opening (17) cut into place. The resulting round piece of glass can then be used to manufacture the plug (10) itself, thereby having the same qualities in thickness, shape, contour and tint as the window section (1) from which the plug (10) came. An alternative method would be to simply match said qualities of the window section (1) in the production of the plug (1) from a separate piece of glass stock. The molding (3) would then be installed about the circumference of the opening (17). The anchor pin assembly (11) and cam lock (14) would then be mounted to the plug (10). The processes for producing the plug (10) and opening (17) shall be cut and made in the same manner as with the manufacture of the window section (1) itself using current industry standards of machinery, technique and tooling as it applies to vehicle glass. This includes tempered glass and safety glass.

I claim:

1. A pet window for vehicles and vehicle accessories; defined as a round opening cut to size into a window section with attached molding around said openings circumference to facilitate closing, sealing, and locking of a plug that is sized to fit into said opening and comprised of like glass in terms of thickness, contour and tint as said window section, said plug being completely removable from said opening and lockable within said opening; that will facilitate the penetration of a pets head for the purpose of accessing the exterior environment from the pets interior location where said window sections exist as a part of vehicles and vehicle accessories.

2. The pet window for vehicles and vehicle accessories as claimed in claim 1, wherein said molding has as a part of it, an interior flange with anchor points for receiving anchor pins and at the opposing side of said interior flange a slot to receive a locking arm of a cam lock.

3. The pet window for vehicles and vehicle accessories as claimed in claim 1, wherein said plug has as a part of it, an anchor pin assembly with anchor pins located to facilitate insertion into said anchor points of said interior flange and at the opposing side of said plug a cam lock located to facilitate its locking arms engagement into said slot of said interior flange.

* * * * *